United States Patent
Wittmeier et al.

(10) Patent No.: US 6,325,528 B1
(45) Date of Patent: Dec. 4, 2001

(54) MOTOR VEHICLE HEADLIGHT ASSEMBLY

(75) Inventors: Erwin Wittmeier, Gomaringen; Heinz Grimm, Pfullingen, both of (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/358,237

(22) Filed: Jul. 21, 1999

(30) Foreign Application Priority Data

Jul. 24, 1998 (DE) .............................................. 198 33 431

(51) Int. Cl.[7] .............................................................. B60Q 1/04
(52) U.S. Cl. ..................... 362/514; 362/513; 362/508; 362/526; 362/280; 362/282; 362/512; 362/464; 362/465; 362/466; 362/467
(58) Field of Search ..................................... 362/513, 514, 362/508, 526, 280, 282, 464, 465, 466, 467, 468, 512, 284, 324, 286

(56) References Cited

U.S. PATENT DOCUMENTS 5,911,502 * 6/1999 Zillgitt et al. ......................... 362/508
5,954,428 * 9/1999 Eichhorn et al. ..................... 362/543
6,007,221 * 12/1999 Taniuchi et al. ..................... 362/465

FOREIGN PATENT DOCUMENTS 44 35 507 A1    4/1996  (DE) ..................................... 362/514

* cited by examiner

Primary Examiner—Stephen Husar
Assistant Examiner—Anabel Ton
(74) Attorney, Agent, or Firm—Michael J. Striker (57) ABSTRACT

A motor vehicle headlight assembly switchable between low-beam and high-beam modes of operation includes a housing, a reflector component mounted in the housing for displacement relative thereto between a plurality of beam aiming positions, and a light source component mounted in the housing for movement relative to the reflector component between a low-beam position and a high-beam position. A motor is provided for displacing the reflector component between the plurality of beam aiming positions relative to the housing. To selectively move the light source component between, and for holding the light source component in at least one of, its low-beam and high-beam positions relative to the reflector component, use is being made of the motor and of an electromagnet operated in sequential cooperation with the motor.

22 Claims, 4 Drawing Sheets

MOTOR VEHICLE HEADLIGHT ASSEMBLY

BACKGROUND OF THE INVENTION

1. Field of the Invention

The present invention relates to headlight assemblies in general, and more particularly to headlight assemblies the light beams of which can be adjusted or switched at least between their high-beam and low-beam positions.

2. Description of the Related Art

There are already known various constructions of motor vehicle headlight assemblies switchable between their low-beam and high-beam operating modes. A typical assembly of this kind includes a housing, in the interior of which there are arranged a reflector component and a light source component. In many motor vehicles, especially recently built ones, the light source component is movable relative to the reflector between its position for the low-beam, and that for the high-beam, mode of operation of the headlight assembly.

An example of a headlight assembly of this kind is disclosed, for instance, in the German patent application. DE 44 35 507 A1. In the headlight assembly revealed there, the light source component is moved, for the purpose of switching between its position corresponding to the low-beam operating mode, and that assumed in the high-beam operating mode of the headlight assembly, both in the direction of the optical axis of the reflector component and transversely to that optical axis. In order to accomplish this movement, there is provided an adjusting member that causes the light source component to pivot relative to the reflector component about a light source pivoting axis. This light source pivoting axis extends substantially perpendicularly to the optical axis of the reflector component and horizontally as considered in the orientation of the headlight assembly when in normal use, at an offset from the optical axis. It is also disclosed there that the adjusting member can be constructed an electric motor, a hydraulic or pneumatic driving unit, or even as an electromagnet.

In the last instance, the electromagnet or solenoid constituting the adjusting member must be relatively large and be dimensioned so as to exhibit a high degree of sturdiness. The effective displacement of the movable part of the electromagnet must be sufficiently large to cover the distance required for moving the light source component between its position for the low beam and that for the high beam. While it would be possible to shorten this required distance by the use of a suitable transmission, this approach would have a negative side effect of requiring the electromagnet to overcome a considerably greater force than in the absence of such a transmission and, consequently, to be built even stronger than before. It will be appreciated, though, that the larger and stronger the electromagnet is, the heavier it is and the greater amount of space must be available for it to occupy. Yet, in this construction a smaller and lighter electromagnet would not be able to reliably perform the function that is expected from it, that is that of the aforementioned adjusting member that switches or moves the light source component between its low-beam and its high-beam position relative to the reflector component.

Moreover, the German patent application No. 44 35 507 A1 mentioned before does not include any indication whatsoever that the adjusting member should or even could be used in the context of the headlight assembly revealed there for any other purpose but for that stated, that is that of moving the light source component relative to the reflector component. As a matter of fact, the disclosure of this application is such as to dissuade a person familiar with its contents from even contemplating any such other use.

OBJECTS OF THE INVENTION

Accordingly, it is a general object of the present invention to avoid the disadvantages of the prior art.

More particularly, it is an object of the present invention to provide a headlight assembly that does not possess the drawbacks of the known vehicle equipment of this type.

Still another object of the present invention is to devise a mechanism for switching the movable parts of the assembly of the type here under consideration between their various positions with respect to one another and the vehicle on which the assembly is mounted, especially between those corresponding to the low-beam and high-beam modes of operation of the assembly, which mechanism would be significantly lighter and occupy a lesser amount of space than similar mechanisms known in the past.

It is yet another object of the present invention to design the above mechanism in such a manner as to keep both the amount of work to be performed by the electromagnet and the range over which the latter needs to be effective to a minimum.

A concomitant object of the present invention is so to construct the headlight assembly of the above type as to be relatively simple in construction, inexpensive to manufacture, easy to use, and yet reliable in operation.

SUMMARY OF THE INVENTION

In keeping with the above objects and others which will become apparent hereafter, one feature of the present invention resides in a motor vehicle headlight assembly switchable between low-beam and high-beam modes of operation that includes a housing, a reflector component mounted in the housing for displacement relative to it between a plurality of beam aiming positions, and a light source component mounted in the housing for movement relative to the reflector component between a low-beam position and a high-beam position. Then, there is provided, in accordance with the invention, means including a motor for displacing the reflector component between the aforementioned plurality of beam aiming positions relative to the housing, and means for selectively moving the light source component between, and for holding the light source component in at least one of, the low-beam and high-beam positions thereof relative to the reflector component, including the motor and an electromagnet cooperating with the motor.

A particular advantage of the headlight assembly construction as described so far is that the electromagnet now does not need to perform all the work needed for displacing the light source component relative to the reflector component because its effect in this respect is augmented, if not supplanted altogether, by that of the motor. As a consequence, it can be dimensioned much smaller than in conventional assemblies using this approach. Moreover, the provision of such a further drive (the motor) in addition to the original one (e.g. the electromagnet) has rendered it possible to envision a dual purpose for such a further drive, that is not only that of moving the light source component between its low-beam and high-beam positions relative to the reflector component, but also that of angularly displacing the reflector component relative to the headlight housing in order to adjust the distance ahead of the vehicle at which, say, the low beam issued by the headlight assembly is aimed. This is quite an important issue that has not been addressed at all in the above application but ought to be considered, especially nowadays when the intensity of the light beams issued by the motor vehicle headlights is already much higher than it was in the past and has a tendency to increase even further. In this regard, the present invention presents the advantage of being able to use the motor to adjust the aimed-at distance for instance in dependence on the loading of the vehicle, that is not only its total load but also, and possibly even more importantly, its distribution, and thus on the inclination of the vehicle relative to the roadway or horizontal plane about a transverse axis of the vehicle, which results from such loading. In this manner, it is possible to give the car occupants and especially the driver the farthest illumination possible under the circumstances by aiming the low beams as far as possible, while simultaneously avoiding blinding the drivers of the vehicles approaching in the opposite direction, by aiming the headlight beams higher relative to the vehicle when the vehicle front is relatively low, and lower when it is relatively high. It is thus possible to keep the distance to which the headlight beams are projected in front of the vehicle, especially in the low-beam mode of operation, substantially the same regardless of the loading of the vehicle.

According to an advantageous feature of the present invention, there is provided means including a control unit for controlling the means for selectively moving and holding the light source component, that is both the electromagnet and the motor. This control unit operates in two different yet not incompatible modes. In one of them, it controls only the position of the reflector component so as to adjust the projection distance of the light beam emitted by the respective headlight. It is only when the control unit is switched into its other mode of operation, in most if not all instances in response to an input from the vehicle driver, that the motor is employed for moving the light source component between its position for the low beam and that for the high beam relative to the reflector component. When this goal has been accomplished, that is after the initial low/high beam mode of operation has been changed to the other mode, the control unit brings the motor from its switching mode of operation back into its original, projection distance determining operating mode.

The headlight assembly of the present invention advantageously further includes means for mounting the light source component in the housing for movement relative to an optical axis of the reflector component. Such mounting means may mount the light source component for movement in the direction of the optical axis of the reflector component. The movement of the light source component with respect to the reflector component in this direction affects the concentration of the light beam issued by the headlight assembly. The lifting of the light beam reflected off of the reflector component into its high-beam position can be achieved, in accordance with the present invention, by so constructing the mounting means as to mount the light source component for movement also in another direction transverse to that of the optical axis of the reflector component, preferably one extending substantially vertically as considered in the orientation assumed by the headlight assembly in its position of use.

According to a particularly advantageous aspect of the present invention, the mounting means includes a pivoting axle that mounts the light source component in the housing for pivoting with respect to the reflector component about an axis that extends substantially horizontally as considered in the use position at a predetermined offset from the optical axis. Owing to this construction, the light source component, especially the light source proper, is moved in the course of such a pivoting movement about the light source component pivoting axis both along the optical axis of the reflector component and transversely to it. As a result, the issued light beam can be concentrated or diffused at the same time as it is being lifted or lowered.

Also in accordance with the present invention, it is proposed for the headlight assembly to further include at least one resilient element interposed between the reflector component and the light source component and urging the light source component toward and keeping the same in a predetermined position relative to the reflector component. Then, the electromagnet constituting a part of the selectively moving means is arranged and effective for attracting the light source component against the action of the resilient element toward another position relative to the reflector component. Such other position of the light source component advantageously is that for the low-beam mode of operation. Yet, in an alternative, this other position of the light source component may be that for the low-beam mode of operation. It is particularly advantageous when the biasing element is a compression spring. When this measure is resorted to, the electromagnet exerts its action in opposition to that of the resilient element and at least holds the light source component in its ultimate position if not aiding the motor in achieving the movement into this position. When it is desired for the light source component to return into its original position (e.g. that corresponding to the low beam mode of operation), the electromagnet is rendered inactive and the force exerted by the resilient component on the light source component returns the latter into its original position relative to the reflector component.

To be able to regulate the distance in front of the vehicle at which the light beam issued by the headlight assembly is aimed, there is further advantageously provided means for supporting the reflector component on the housing for pivoting relative to it about a pivoting axis extending transversely with respect to the optical axis of the reflector component. It is especially advantageous for the pivoting axis to extend substantially horizontally as considered in an orientation assumed by the assembly when in its position of use.

Advantageously, the electromagnet is secured to the reflector component, especially at a distance from the optical axis of the reflector component. It is further advantageous when the light source component includes a flange that is disposed in a substantially juxtaposed relationship with respect to an active side of the electromagnet, and when at least one resilient element is interposed between the reflector component and the light source component, being operative for urging the electromagnet away from the flange. When the light source component is moved into its aforementioned other position relative to the reflector component, the flange, which is arranged at a distance from the light source component pivoting axis, comes into contact with the electromagnet and is magnetically attracted to it so long as the electromagnet is energized. The flange thus constitutes a part of a lever by means of which the force needed to be exerted by the electromagnet on it to magnetically attract it can be significantly reduced relative to what was needed prior to this invention. As a result, the electromagnet can be of a very compact, low-weight and relatively low-strength construction.

However, the presence of this lever arm also means consequence that the distance that the electromagnet would have to cover to move the light source component on its own from its original position into its other position relative to the reflector component would be considerably increased. To avoid this undesirable consequence, the present invention utilizes, as already mentioned before, the motor for augmenting, enhancing or even to a great extent or altogether supplanting the operation of the electromagnet in this respect. More particularly, the motor is being used in the course of the switching process from the initial to the other of the low-beam and high-beam positions of the light source component relative to the reflector component to perform at least the predominant amount of work (and accomplish most if not all of the movement) involved for this switching, bringing the electromagnet and the flange, if not into contact with one another, then at least in such a close proximity of each other that the relatively meager magnetic force the electromagnet is capable of exerting on the flange to magnetically attract the same is nevertheless sufficient to complete their movement into contact with one another, if need be, and certainly more than sufficient to keep them in such contact until the electromagnet is de-energized.

It is further advantageous for the headlight assembly to include an abutment rigidly connected to the housing and situated in an opposing relationship with respect to a side of the flange that faces oppositely away from the electromagnet. This abutment serves the purpose of converting the angular displacement of the light source component with the reflector component about the reflector component pivoting axis, from a predetermined angle of displacement of the reflector component on, into a pivoting movement of the light source component about the light source component pivoting axis.

The advantages of the present invention come particularly to the fore when the light source component incorporates, in accordance with a significant feature of the present invention, at least one gas discharge element as its light source.

Still another advantageous aspect of the present invention is to be found in a motor vehicle headlight assembly switchable between low-beam and high-beam modes of operation, which includes a housing; a reflector component having an optical axis and mounted in the housing for angular displacement relative thereto about a reflector component pivoting axis extending transversely to the optical axis at an offset therefrom between a plurality of beam aiming positions; a light source component mounted in the housing for angular movement relative to the reflector component about a light source component pivoting axis extending transversely to the optical axis at a predetermined distance therefrom between a low-beam position and a high-beam position; means including a motor for angularly displacing the reflector component between the plurality of beam aiming positions relative to the housing; means for selectively moving the light source component between, and for holding the light source component in at least one of, the low-beam and high-beam positions thereof relative to the reflector component, including the motor and an electromagnet secured to the reflector component at a distance from the optical axis of the reflector component, cooperating with the motor and having an active side; a flange disposed on the light source component in a substantially juxtaposed relationship with respect to the active side of the electromagnet and having a side facing oppositely away from the electromagnet; at least one resilient element interposed between the reflector component and the light source component and operative for urging the electromagnet away from the flange; an abutment rigidly connected to the housing and situated in an opposing relationship with respect to the oppositely facing side of the flange; and means including a control unit for controlling the means for selectively moving and holding the light source component. In this context, the present invention proposes for the control unit to be operative for initially operating the motor in such a manner as to displace the reflector component through an angle a about the reflector component pivoting axis, entraining the light source component for joint displacement therewith out of its initial position, until the oppositely facing side of the flange abuts the abutment; subsequently operating the motor in such a manner as to displace the reflector component through an additional angle β about the reflector component pivoting axis with the consequence that the flange, together with the light source component, simultaneously angularly moves about the light source component pivoting axis through an angle γ at which the flange and the active side of the electromagnet come into contact with each other; activating the electromagnet immediately thereafter at the latest for the active side thereof to magnetically attract the flange against the urging action of the resilient element; and subsequently operating the motor in such a manner as to displace the reflector component back about the reflector component pivoting axis through the angle α+β while keeping the electromagnet in its active state to retain the light source component angularly moved by the angle γ out of its initial position. When it is later desired to return the light source component into its original position with respect to the reflector component, the control unit is operated in such a manner as to cause the electromagnet to become inactive. When this occurs, the force of the resilient element moves the flange away from the active side of the electromagnet and also angularly displaces the same, together with the remainder of the light source of which it constitutes a part, into its original position.

The present invention is also directed to a method of operating a motor vehicle headlight assembly switchable between low-beam and high-beam modes of operation and including a housing, a reflector component mounted in the housing for displacement relative thereto between a plurality of beam aiming positions, a light source component mounted in the housing for movement relative to the reflector component between a low-beam position and a high-beam position, a motor operative for displacing the reflector component between the plurality of beam aiming positions relative to the housing, and an electromagnet mounted on one of the components and capable of magnetically attracting the other, this method including the step of operating the motor and the electromagnet in such a manner as to jointly move the light source component between the low-beam and high-beam positions thereof relative to the reflector component.

Last but not least, it is also advantageous when, in accordance with another facet of the present invention, there is provided a method of operating a motor vehicle headlight assembly switchable between low-beam and high-beam modes of operation and including a housing, a reflector component having an optical axis and mounted in the housing for angular displacement relative thereto about a reflector component pivoting axis extending transversely to the optical axis at an offset therefrom between a plurality of beam aiming positions, a light source component mounted in the housing for angular movement relative to the reflector component about a light source component pivoting axis extending transversely to the optical axis at a predetermined distance therefrom between a low-beam position and a high-beam position, a motor for angularly displacing the reflector component between the plurality of beam aiming positions relative to the housing; an electromagnet secured to the reflector component at a distance from the optical axis of the reflector component, cooperating with the motor and having an active side, a flange disposed on the light source component in a substantially juxtaposed relationship with respect to the active side of the electromagnet and having a side facing oppositely away from the electromagnet, at least one resilient element interposed between the reflector component and the light source component and operative for urging the electromagnet away from the flange; and an abutment rigidly connected to the housing and situated in an opposing relationship with respect to the oppositely facing side of the flange. In this environment, the inventive method includes the step of selectively moving the light source component between, and for holding the light source component in at least one of, its low-beam and high-beam positions relative to the reflector component, including the constituent steps of initially operating the motor in such a manner as to displace the reflector component through an angle α about the reflector component pivoting axis, entraining the light source component for joint displacement therewith out of an initial position thereof, until the oppositely facing side of the flange abuts the abutment; subsequently operating the motor in such a manner as to displace the reflector component through an additional angle β about the reflector component pivoting axis with the consequence that the flange, together with the light source component, simultaneously angularly moves about the light source component pivoting axis through an angle γ at which the flange and the active side of the electromagnet come into contact with each other; activating the electromagnet immediately thereafter at the latest for the active side thereof to magnetically attract the flange against the urging action of the resilient element; and subsequently operating the motor in such a manner as to displace the reflector component back about the reflector component pivoting axis through the angle α+β while keeping the electromagnet in its active state to retain the light source component angularly moved by the angle y out of the initial position thereof.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
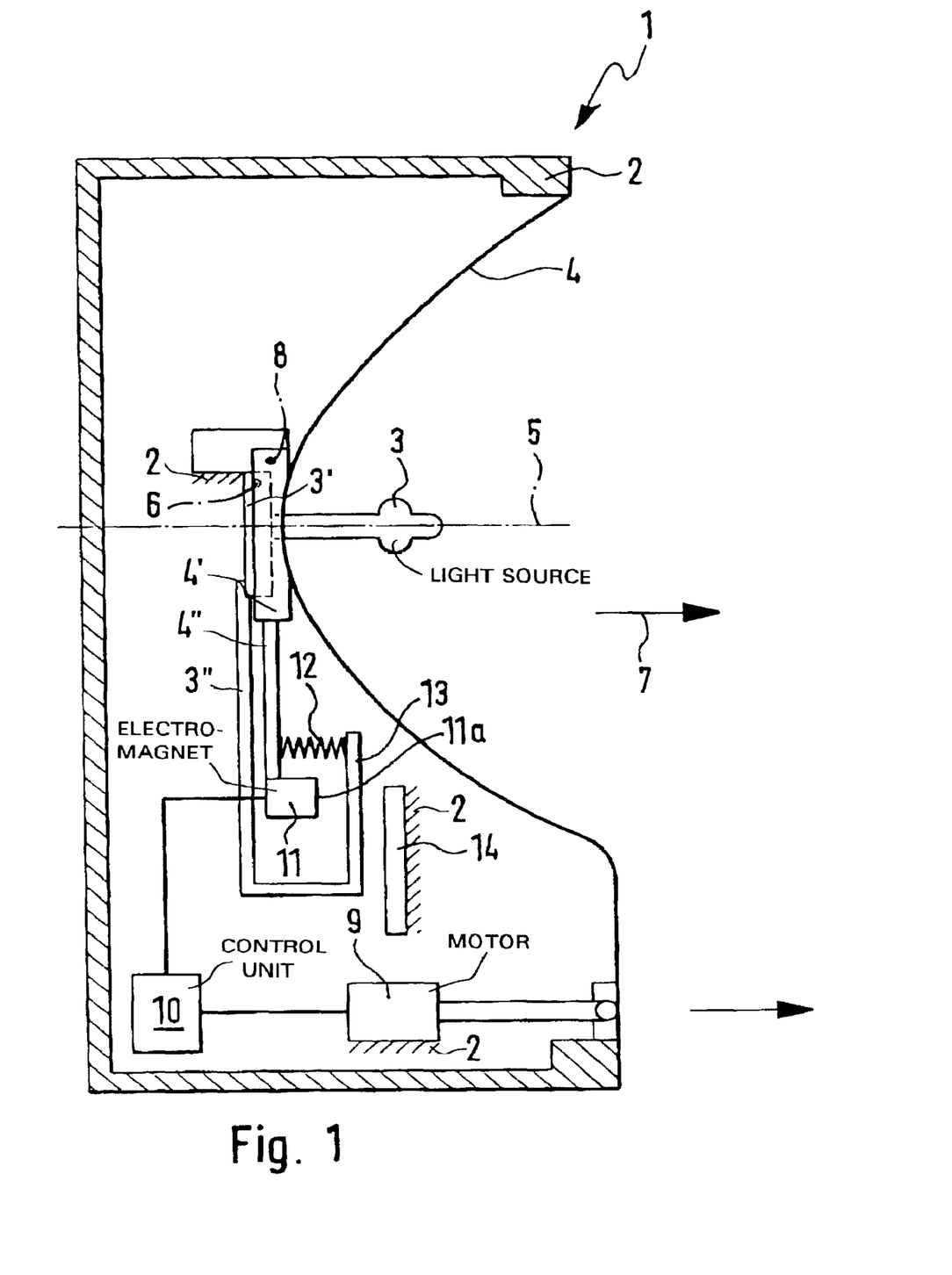
FIG. 1 is a somewhat simplified, diagrammatic cross-sectional view of a headlight assembly embodying the present invention, in its condition assumed while being operated at low beam.
Figure 2:
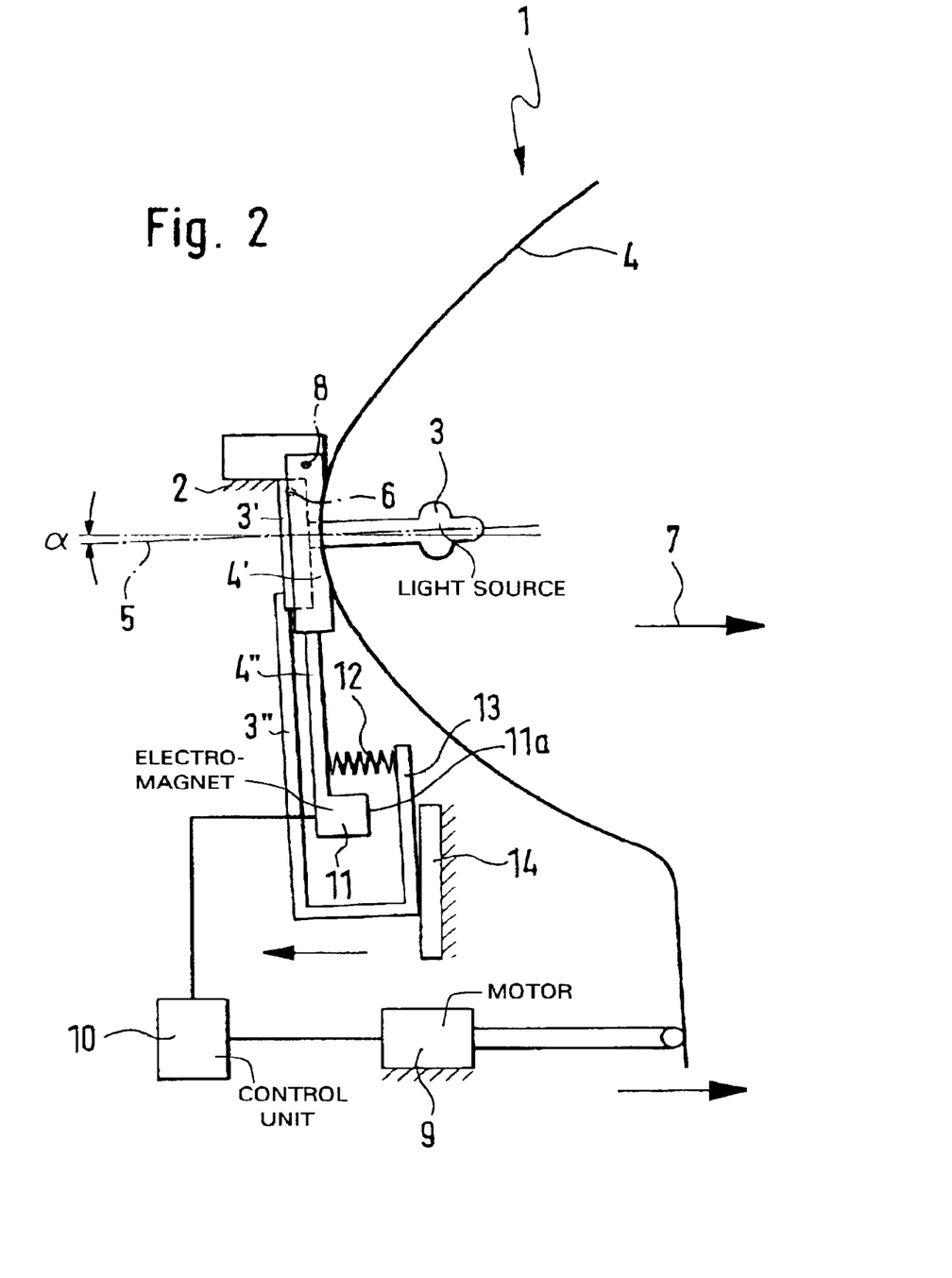
FIG. 2 is a view akin to that of FIG. 1 but in a first switched position of the headlight assembly.
Figure 3:
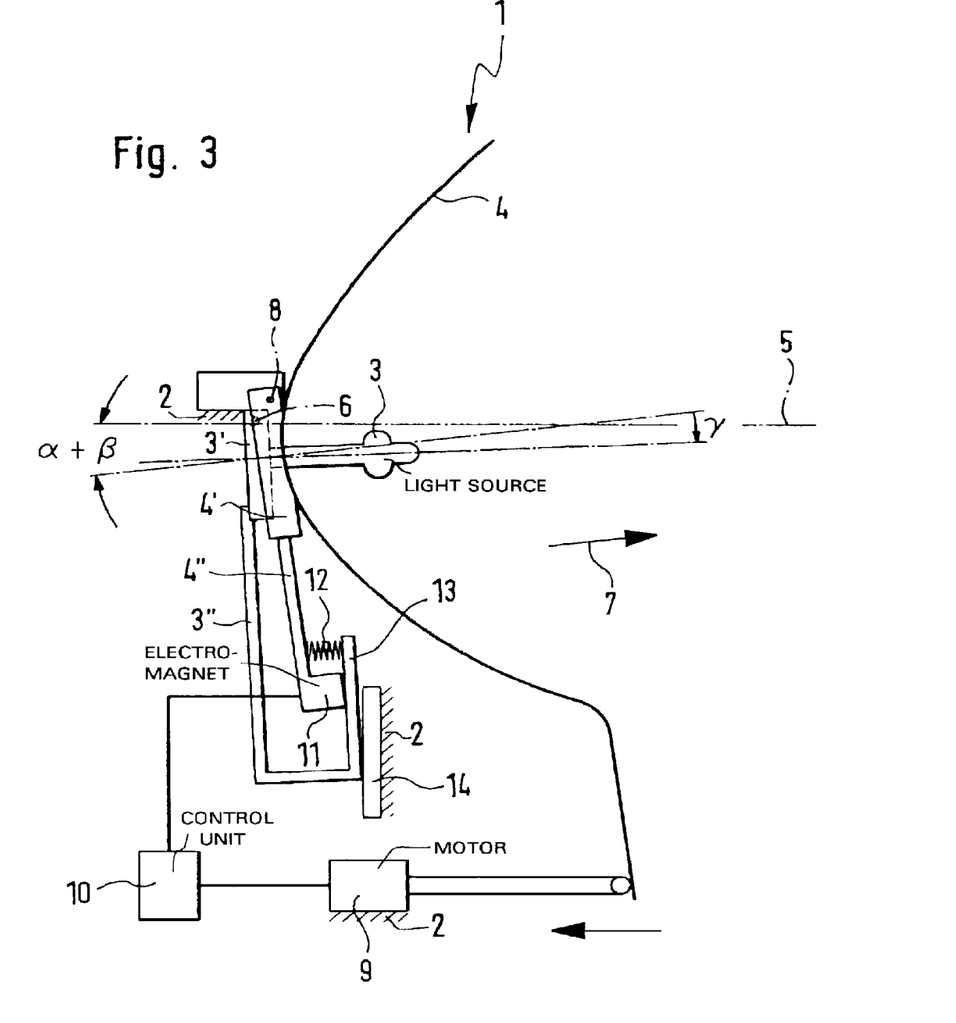
FIG. 3 is another view similar to that of FIG. 1 but in a second switched position.
Figure 4:
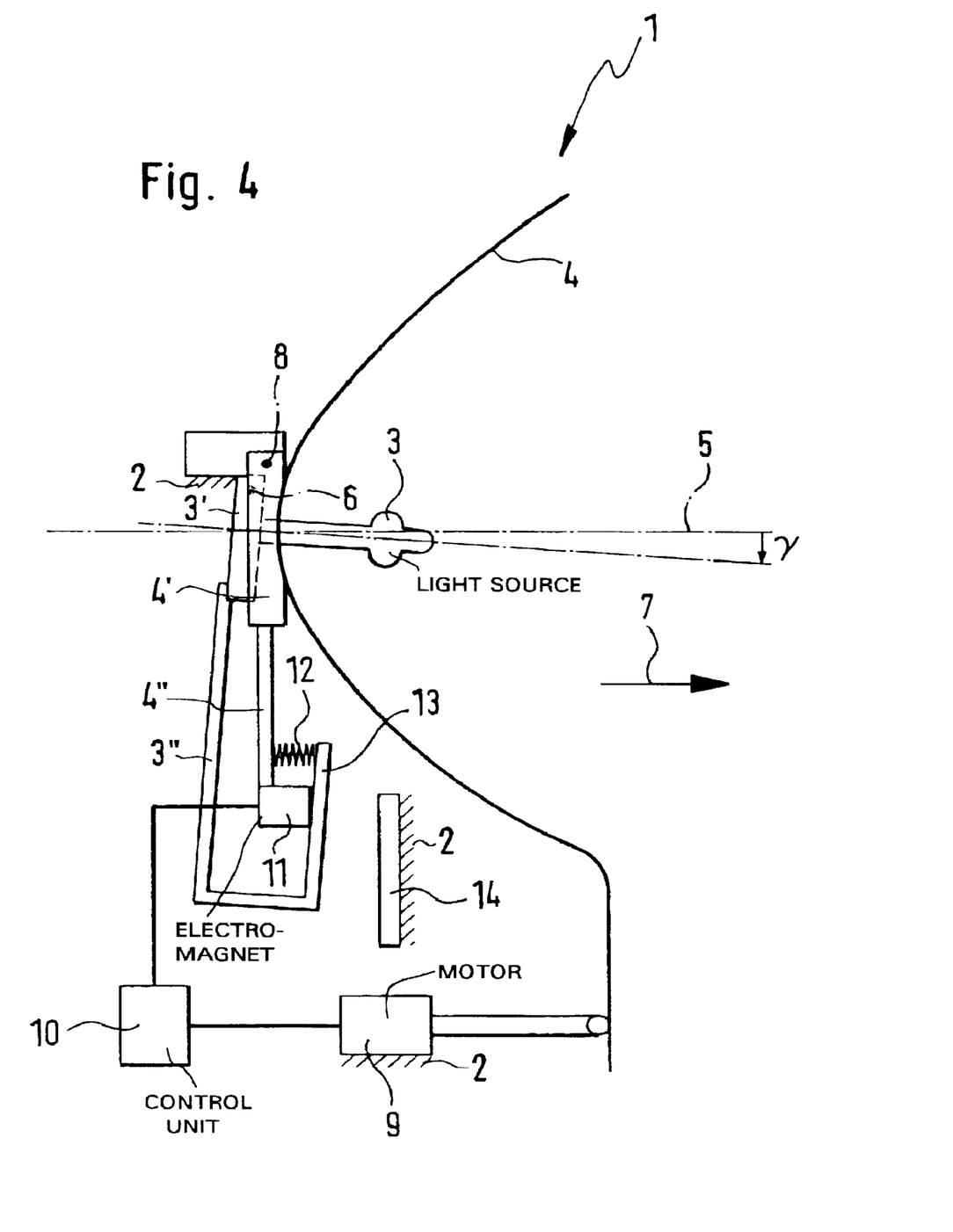
FIG. 4 is yet another view corresponding to that of FIG. I but in a condition of operation at high beam.

Referring now to the drawing in detail, it is to be mentioned first that all of its FIGS. 1 to 4 all depict the very same adjustable vehicle headlight assembly in substantially identical views, but each depicting that assembly in a different condition with its adjustable constituent components assuming different positions, starting with that for a low beam shown in FIG. 1 thereof, through two switched or adjusted intermediate positions illustrated in FIGS. 2 and 3, respectively, and ending with the position of FIG. 4 in which the headlight assembly emits a high beam.

While the same reference numerals and conventions have been used throughout the drawing, they will be introduced first in conjunction with FIG. 1. As may be seen there, the reference numeral 1 has been used to identify the aforementioned positionally adjustable headlight assembly in its totality. This headlight assembly 1 includes a housing 2 in the interior of which there is arranged a light source 3 and a reflector 4. For ease of understanding, it is to be mentioned at this juncture that the light source 3 proper and the reflector 4 as such include and/or are rigidly connected with their respective supports 3' and 4', and that each of these supports 3' and 4' carries and/or is rigidly connected with its own extension 3" or 4", respectively. The light source 3, and more particularly its support 3', is mounted in the housing 2 for pivoting relative to the reflector 4 about a light source pivot or axle 6 that extends horizontally at a vertical distance from an optical axis 5 of the reflector 4. In this connection, it is to be mentioned that all references to absolute or relative orientations of the various elements of the assembly 1 are to be understood to relate solely to the position of the assembly 1 that is illustrated in the drawing; it may well correspond to that assumed by the assembly 1 when in intended use, but need not necessarily.

For adjustment or switching between a condition or position for a low beam and that for a high beam, the light source 3 can be pivoted relative to the reflector 4 about the light source axle 6. As a result of this pivoting around the light source axle 6, the light source 3 itself, that is its light-issuing region, is moved both in the direction of is the optical axis 5 of the reflector 4, and vertically or transversely of the optical axis 5 of the reflector 4.

The reflector 4, in turn, is mounted on the housing 2 for pivoting about a reflector pivoting axle 8 that extends horizontally and transversely to a light exit direction 7. As a result of such a pivoting, the reflector 4 can be moved relative to the housing 2 perpendicularly to the light exit direction 7 for the purpose of controlling or regulating the distance at which the light beam issued by the headlight assembly I is aimed (also referred to herein for the sake of simplicity interchangeably as either "distance" or "aim"). For accomplishing this pivoting of the reflector 4 about the reflector pivoting axle 8, the headlight assembly 1 is equipped with a motor 9. The operation of the motor 9 for the regulation of the light beam aim is controlled by a control unit 10 in such a manner that the distance at which the light beam issued by the headlight assembly 1 is aimed is regulated based on momentary conditions under which the vehicle equipped with the assembly 1 is being operated, ordinarily in dependence on the inclination of the vehicle about the transverse axis of the vehicle. In this manner, it is possible to assure that the vehicle headlights will illuminate basically the same area ahead of the vehicle regardless of how much or how little the vehicle is loaded, and how that load is distributed within the vehicle. Exactly how this regulation of the position of the reflector component 3 by the motor 9 is accomplished under the control of the control unit 10 is of no significance in the context of the present invention, however, and hence no further explanation thereof beyond what is necessary for understanding the role the motor 9 and the control unit 10 play in connection with the present invention need be provided, nor will it be.

An electromagnet 11 is secured to the reflector 4, and more particularly to the extension 4' of its support 4', at a vertical distance from the optical axis 5 of the reflector 4 proper. A flange or armature 13 of a magnetically attractable material is secured to the light source 3, and more particularly to the extension 3" of its support 3', in such a manner that it is located in an opposing or facing relationship with respect to an active surface or side 11a of the electromagnet 11. A compression spring 12 urges the flange 13 away from the active side 11a of the electromagnet 11. An abutment 14 is rigidly mounted on the housing 2 in an opposing relationship or juxtaposition with and normally or initially at a distance from a side of the flange 13 that faces oppositely away from the active side 11a of the electromagnet 11.

As a result of this construction, the headlight assembly 1 in accordance with the present invention includes three separate structural groups or constituent components that are respectively movable relative to one another. The first one of these groups is constituted by the housing 2 on which there are mounted the motor 9 for the illumination distance adjustment and the abutment 14. A second one of these structural groups or constituent components can be pivoted relative to this first structural group about the reflector pivoting axle 8. This second structural group includes the reflector 4 with its associated parts 4' and 4" and the electromagnet 11. A third one of such structural groups or constituent components can be pivoted in relation to the second structural group about the light source pivoting axle 6. This third constituent component includes the light source 3 with its associated parts 3' and 3" and the flange 13.

Now that the construction of the headlight assembly 1 of the present invention has been thus described, the operation of this assembly 1 and particularly its adjustment or switching between its condition of FIG. 1 corresponding to the issuance of the low beam and, ultimately, its condition of FIG. 4 that results in the issuance of the high beam will be discussed in some detail. Initially, the control unit 10 causes the motor 9 for the light beam aim regulation to operate in such a manner that it causes the reflector 4, together with the light source 3, to pivot about the reflector pivoting axle 8 by an angle $\alpha$ (viz. FIG. 2), at which point in time the flange 13 abuts the abutment 14. After that, the control unit 10 causes the motor 9 for the light beam aim regulation to continue its operation in such a manner that the reflector 4 is pivoted further about the reflector pivoting axle 8 by an additional angle $\beta$. Simultaneously therewith, the flange 13, together with the light source 3, is pivoted, against the biasing force exerted thereupon by the compression spring 12, about the light source pivoting axle 6 through an angle $\gamma$, until the flange 13 and the active side 11a of the electromagnet 11 contact one another (see FIG. 3). It will be appreciated that the flange 13 cannot share in the movement of the reflector 4 through the angle $\beta$ during this phase of the operation, inasmuch as it has met during its pivotal movement through the angle $\alpha$ with the abutment 14 and the latter, being secured to the housing 2, prevents it from continuing further.

In the adjusted or switched position that can be observed in FIG. 3 of the drawing, the control unit 10 then (or even prior to reaching this switched position) activates the electromagnet 11 in such a manner that the active side 11a of the latter is magnetically attracted to the flange 13 and is held in contact with it with a force and moment exceeding those exerted by the compression spring 12 that attempts to push them apart, with a sufficient margin of safety to keep them together even during travel on rough roadways or when subjected to vibrations or jolts originating from other sources. After this secure magnetic attraction is achieved, the control unit 10 causes the motor 9 for the light beam distance or aim regulation to operate in such a manner that it moves the reflector 4, together with the light source 3, back through the angle $\alpha+\beta$ substantially into their original positions (compare FIG. 4). However, the light source 3 remains angularly displaced with respect to the reflector 4 by the angle $\gamma$, inasmuch as the electromagnet 11 remains activated at this time and holds its active side 11a in contact with the flange 13.

In this way, the headlight assembly 11 has been adjusted from its condition for issuing the low beam into its condition at which it issues the high beam. Now, when it is desired to return the headlight assembly 1 into its low beam issuance condition, it is merely necessary for the control unit 10 to discontinue the activation of the electromagnet 11. When this happens, and as a result of this happening, the flange 13 and with it the light source 3 proper can and will be returned by the force exerted by the compression spring 12 into the original position of FIG. 1 in which the flange 13 is once more situated at a distance from the electromagnet 11.

The light source 3 proper used in the headlight assembly 1 of this construction is advantageously constructed as a gas discharge element, such as a bulb or tube.

It will be understood that each of the elements described above, or two or more together, may also find a useful application in other types of constructions differing from the type described above.

While the present invention has been described and illustrated herein as embodied in a specific construction of a motor vehicle headlight assembly, it is not limited to the details of this particular construction, since various modifications and structural changes may be made without departing from the spirit of the present invention. So, for instance, it is possible and contemplated within the purview of the present invention to modify the assembly 1 in such a manner that the high beam condition thereof would be the "starting" and the low beam condition its "displaced" state. One quite simple modification that would achieve this purpose would involve arranging at least the elements 3", 4" and 11 to 14 mirror-symmetrically relative to their illustrated positions with respect to the horizontal plane incorporating the optical axis 5, that is above rather than below that plane so that the spring 12 would urge the light source 3 toward its high beam position, and to change the operation of the control unit accordingly so that it would operate the motor 9 (whether it remains below or is also moved to above that plane) in such a manner as to augment and/or supplant the action of the electromagnet 11 in a manner akin to that described above except for being effective for displacing the light source 3 towards its low beam position rather than vice versa.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended claims.

We claim:

1. A motor vehicle headlight assembly switchable between low-beam and high-beam modes of operation, comprising:
   a) a housing;
   b) a reflector component mounted in said housing for displacement relative thereto between a plurality of beam aiming positions;

c) a light source component mounted in said housing for movement relative to said reflector component between a low-beam position and a high-beam position;
d) means including a motor for displacing said reflector component between said plurality of beam aiming positions relative to said housing; and
e) means for selectively moving said light source component between, and for holding said light source component in at least one of, said low-beam and high-beam positions thereof relative to said reflector component, including said motor and an electromagnet cooperating with said motor.

2. The headlight assembly as defined in claim 1, and further comprising means including a control unit for controlling said means for selectively moving and holding said light source component.

3. The headlight assembly as defined in claim 1, wherein said reflector component has an optical axis; and further comprising means for mounting said light source component in said housing for movement relative to said optical axis.

4. A motor vehicle headlight assembly switchable between low-beam and high-beam modes of operation, comprising:
a) a housing;
b) a reflector component mounted in said housing for displacement relative thereto between a plurality of beam aiming positions;
c) a light source component mounted in said housing for movement relative to said reflector component between a low-beam position and a high-beam position;
d) means including a motor for displacing said reflector component between said plurality of beam aiming positions relative to said housing; and
e) means for selectively moving said light source component between, and for holding said light source component in at least one of, said low-beam and high-beam positions thereof relative to said reflector component, including said motor and an electromagnet cooperating with said motor, said mounting means being operative for mounting said light source component for movement at least in the direction of said optical axis of said reflector component.

5. The headlight assembly as defined in claim 4, wherein said mounting means is operative for mounting said light source component for movement also in another direction transverse to the direction of said optical axis of said reflector component.

6. The headlight assembly as defined in claim 5, wherein said other direction is substantially vertical as considered in the orientation assumed by the headlight assembly in a position of use thereof.

7. The headlight assembly as defined in claim 6, wherein said mounting means includes a pivoting axle that mounts said light source component in said housing for pivoting with respect to said reflector component about an axis that extends substantially horizontally as considered in said use position at a predetermined offset from said optical axis.

8. The headlight assembly as defined in claim 7, and further comprising one resilient element interposed between said reflector component and said light source, said resilient element urging said light source component toward and keeping the same in a predetermined position relative to said reflector component; and wherein said electromagnet constituting a part of said selectively moving means is effective for attracting said light source component against the action of said resilient element toward another position relative to said reflector component.

9. The headlight assembly as defined in claim 8, wherein said other position of said light source component is that for the low-beam mode of operation.

10. The headlight assembly as defined in claim 8, wherein said other position of said light source component is that for the low-beam mode of operation.

11. The headlight assembly as defined in claim 8, wherein said resilient element is a compression spring.

12. The headlight assembly as defined in claim 1, and further comprising means for supporting said reflector component on said housing for pivoting relative thereto about a pivoting axis extending transversely with respect to said optical axis.

13. The headlight assembly as defined in claim 12, wherein said pivoting axis extends substantially horizontally as considered in an orientation assumed by the assembly when in its position of use.

14. The headlight assembly as defined in claim 6, wherein said electromagnet is secured to said reflector component at a distance from said optical axis of said reflector component.

15. The headlight assembly as defined in claim 7, wherein said electromagnet has an active side; and wherein said light source component includes a flange of a magnetically attractable material that is disposed in a substantially juxtaposed relationship with respect to said active side of said electromagnet.

16. The headlight assembly as defined in claim 15, and further comprising at least one resilient element interposed between said reflector component and said light source component and operative for urging said electromagnet away from said flange.

17. The headlight assembly as defined in claim 16, wherein said flange has a side facing oppositely away from said electromagnet; and further comprising an abutment rigidly connected to said housing and situated in an opposing relationship with respect to said oppositely facing side of said flange.

18. The motor vehicle headlight assembly as defined in claim 1, wherein said light source component incorporates at least one gas discharge element as a light source thereof.

19. A motor vehicle headlight assembly switchable between low-beam and high-beam modes of operation, comprising a housing; a reflector component having an optical axis and mounted in said housing for angular displacement relative thereto about a reflector component pivoting axis extending transversely to said optical axis at an offset therefrom between a plurality of beam aiming positions; a light source component mounted in said housing for angular movement relative to said reflector component about a light source component pivoting axis extending transversely to said optical axis at a predetermined distance therefrom between a low-beam position and a high-beam position; means including a motor for angularly displacing said reflector component between said plurality of beam aiming positions relative to said housing; means for selectively moving said light source component between, and for holding said light source component in at least one of, said low-beam and high-beam positions thereof relative to said reflector component, including said motor and an electromagnet secured to said reflector component at a distance from said optical axis of said reflector component, cooperating with said motor and having an active side; a flange or a magnetically attractable material disposed on said light source component in a substantially juxtaposed relationship with respect to said active side of said electromagnet and having a side facing oppositely away from said electromagnet; at least one resilient element interposed between said reflector component and said light source component and operative for urging said electromagnet away from said flange; an abutment rigidly connected to said housing and situated in an opposing relationship with respect to said oppositely facing side of said flange; and means including a control unit for controlling said means for selectively moving and holding said light source component, operative for i) initially operating said motor in such a manner as to displace said reflector component through an angle α about said reflector component pivoting axis, entraining said light source component for joint displacement therewith out of an initial position thereof, until said oppositely facing side of said flange abuts said abutment;

ii) subsequently operating said motor in such a manner as to displace said reflector component through an additional angle β about said reflector component pivoting axis with the consequence that said flange, together with said light source component, simultaneously angularly moves about said light source component pivoting axis through an angle γ at which said flange and said active side of said electromagnet come into contact with each other;

iii) activating said electromagnet immediately thereafter at the latest for said active side thereof to magnetically attract said flange against the urging action of said resilient element; and iv) subsequently operating said motor in such a manner as to displace said reflector component back about said reflector component pivoting axis through the angle α+β while keeping said electromagnet in its active state to retain said light source component angularly moved by said angle γ out of said initial position thereof.

20. A method of operating a motor vehicle headlight assembly switchable between low-beam and high-beam modes of operation and including a housing, a reflector component having an optical axis and mounted in the housing for angular displacement relative thereto about a reflector component pivoting axis extending transversely to the optical axis at an offset therefrom between a plurality of beam aiming positions; a light source component mounted in the housing for angular movement relative to the reflector component about a light source component pivoting axis extending transversely to the optical axis at a predetermined distance therefrom between a low-beam position and a high-beam position; a motor for angularly displacing the reflector component between the plurality of beam aiming positions relative to the housing; an electromagnet secured to the reflector component at a distance from the optical axis of the reflector component, cooperating with the motor and having an active side; a flange of a magnetically attractable material disposed on the light source component in a substantially juxtaposed relationship with respect to the active side of the electromagnet and having a side facing oppositely away from the electromagnet; at least one resilient element interposed between the reflector component and the light source component and operative for urging the electromagnet away from the flange; and an abutment rigidly connected to the housing and situated in an opposing relationship with respect to the oppositely facing side of the flange, comprising the step of selectively moving the light source component between, and for holding the light source component in at least one of, the low-beam and high-beam positions thereof relative to the reflector component, including the steps of i) initially operating the motor in such a manner as to displace the reflector component through an angle α about the reflector component pivoting axis, entraining the light source component for joint displacement therewith out of an initial position thereof, until the oppositely facing side of the flange abuts the abutment;

ii) subsequently operating the motor in such a manner as to displace the reflector component through an additional angle β about the reflector component pivoting axis with the consequence that the flange, together with the light source component, simultaneously angularly moves about the light source component pivoting axis through an angle γ at which the flange and the active side of the electromagnet come into contact with each other;

iii) activating the electromagnet immediately thereafter at the latest for the active side thereof to magnetically attract the flange against the urging action of the resilient element; and iv) subsequently operating the motor in such a manner as to displace the reflector component back about the reflector component pivoting axis through the angle α+β while keeping the electromagnet in its active state to retain the light source component angularly moved by the angle γ out of the initial position thereof.

21. A motor headlight assembly switchable between low-beam and high-beam modes of operation; comprising:

a) a housing;

b) a reflector component mounted in said housing for displacement relative thereto between a plurality of beam aiming positions;

c) a light source component mounted in said housing for movement relative to said reflector component between a low-beam position and a high-beam position;

d) means including a motor for displacing said reflector component between said plurality of beam aiming positions relative to said housing; and e) means for selectively moving said light source component between, and for holding said light source component in at least one of, said low-beam and high-beam positions thereof relative to said reflector component, including said motor and an electromagnet cooperating with said motor, whereas a displacement of said reflector component exceeding a certain displacement angle (α) provokes a movement of said light source component by an angle (γ) relative to said reflector component and activating said electromagnet retains the light source component in said angularly moved position.

22. A method of operating a motor vehicle headlight assembly switchable between low-beam and high-beam modes of operation and including a housing, a reflector component mounted in the housing for displacement relative thereto between a plurality of beam aiming positions, a light source component mounted in the housing for movement relative to the reflector component between a low-beam position and a high-beam position, a motor operative for displacing said reflector component between said plurality of beam aiming positions relative to the housing, and an electromagnet mounted on one of the components and capable of magnetically attracting the other, comprising the step of operating the motor and the electromagnet in such a manner as to jointly move the light source component between the low-beam and high-beam positions thereof relative to the reflector component.

* * * * *